(12) United States Patent
Stankovska et al.

(10) Patent No.: US 11,856,261 B1
(45) Date of Patent: Dec. 26, 2023

(54) SYSTEM AND METHOD FOR REDACTION BASED ON GROUP ASSOCIATION

(71) Applicant: MOTOROLA SOLUTIONS, INC., Chicago, IL (US)

(72) Inventors: Daniela Stankovska, Fort Lauderdale, FL (US); Anoop Sehgal Paras Ram, Ipoh (MY); Chun Meng Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/936,466

(22) Filed: Sep. 29, 2022

(51) Int. Cl.
*H04N 21/454* (2011.01)

(52) U.S. Cl.
CPC .............................. *H04N 21/4542* (2013.01)

(58) Field of Classification Search
None
See application file for complete search history.

(56) References Cited

U.S. PATENT DOCUMENTS

| | | | |
|---|---|---|---|
| 10,395,056 B2* | 8/2019 | Li .......................... | G06V 40/165 |
| 2009/0089828 A1* | 4/2009 | Carlsgaard ......... | H04N 21/4532 725/28 |
| 2011/0052062 A1* | 3/2011 | Chiu .................... | G06V 30/413 382/176 |
| 2012/0090000 A1* | 4/2012 | Cohen ................. | H04N 21/8355 725/32 |
| 2014/0029804 A1* | 1/2014 | Kawaguchi ............. | G06T 11/60 382/105 |
| 2014/0177915 A1* | 6/2014 | Fan ......................... | G06T 7/593 382/103 |
| 2014/0335950 A1* | 11/2014 | Sugiue .................... | A63F 13/67 463/31 |
| 2015/0030314 A1* | 1/2015 | Skarakis ................ | G06V 40/23 386/278 |
| 2015/0070516 A1* | 3/2015 | Shoemake ......... | H04N 21/4542 348/207.11 |
| 2015/0213702 A1* | 7/2015 | Kimmel ................. | G06V 20/52 382/103 |
| 2015/0340016 A1* | 11/2015 | Lablans ................. | H04N 21/40 345/643 |
| 2016/0057497 A1* | 2/2016 | Kim .................... | H04N 21/4415 725/10 |
| 2017/0289624 A1* | 10/2017 | Avila .................... | G06V 10/464 |
| 2018/0376205 A1* | 12/2018 | Oswal .................. | G06T 19/006 |

(Continued)

OTHER PUBLICATIONS

Gustof, Grzegorz, et al.: "Device and Method for Redacting Records Based on a Contextual Correlation with a Previously Redacted Record", U.S. Appl. No. 17/645,494, filed Dec. 22, 2021, all pages.

(Continued)

*Primary Examiner* — An Son P Huynh (57) ABSTRACT

A system and method for redaction based on group association is disclosed. The method includes carrying out an analysis that includes coming to a determination that, notwithstanding at least some features of a plurality of group-associated objects are being concealed, a visible association between the objects in combination with size and shape definitions for corresponding redactions of the group-associated objects is such that an identity deducibility condition is either met or is not met.

19 Claims, 3 Drawing Sheets

(56) References Cited

U.S. PATENT DOCUMENTS

| | | | |
|---|---|---|---|
| 2019/0147185 A1* | 5/2019 | Cai | G06V 40/173 |
| | | | 726/30 |
| 2020/0059703 A1* | 2/2020 | Sonare | H04N 21/23418 |
| 2022/0124407 A1* | 4/2022 | Grover | H04N 7/147 |
| 2022/0164472 A1* | 5/2022 | Cannon | H04L 51/18 |
| 2022/0198677 A1* | 6/2022 | Bisain | G06T 7/174 |
| 2022/0269820 A1* | 8/2022 | Singh Bawa | G06F 18/214 |
| 2022/0286438 A1* | 9/2022 | Burke, Jr. | H04L 63/1416 |
| 2022/0310226 A1* | 9/2022 | Niri | G06F 18/214 |
| 2022/0414264 A1* | 12/2022 | Ananthanarayanan | |
| | | | H04L 67/12 |

OTHER PUBLICATIONS

T. Orekondy, M. Fritz and B. Schiele, "Connecting Pixels to Privacy and Utility: Automatic Redaction of Private Information in Images," 2018 IEEE/CVF Conference on Computer Vision and Pattern Recognition, 2018, pp. 8466-8475, doi: 10.1109/CVPR.2018.00883.

M. Shao, L. Li and Y. Fu, "What Do You Do? Occupation Recognition in a Photo via Social Context," 2013 IEEE International Conference on Computer Vision, 2013, pp. 3631-3638, doi: 10.1109/ICCV.2013.451.

* cited by examiner

```
        ┌─────────────────────────────────────────────────────────┐
        │ ANALYZING FIRST REDACTED VIDEO/IMAGE DATA THAT INCLUDES │
 256 ── │ FIRST REDACTIONS SIZED AND SHAPED TO CONCEAL AT LEAST   │
        │ SOME FEATURES OF AT LEAST FIRST AND SECOND OBJECTS      │
        └─────────────────────────────────────────────────────────┘
```

260 — IS THERE A DETERMINATION FROM THE ANALYZING THAT, BASED ON A VISIBLE ASSOCIATION BETWEEN THE FIRST AND SECOND OBJECTS IN COMBINATION WITH FIRST SIZE AND SHAPE DEFINITIONS OF THE FIRST REDACTIONS, AN IDENTITY DEDUCIBILITY CONDITION IS MET? — YES

NO

264 — GENERATING AN INDICATION THAT THE FIRST REDACTED DATA IS SUFFICIENTLY REDACTED FOR AN INTENDED PURPOSE

270 — CONVERTING THE FIRST REDACTED DATA INTO SECOND REDACTED DATA, THAT INCLUDES SECOND REDACTIONS HAVING SECOND SIZE AND SHAPE DEFINITIONS, AND THE SECOND REDACTIONS MORE SUFFICIENTLY CONCEALING IDENTITIES OF THE FIRST AND SECOND OBJECTS

SYSTEM AND METHOD FOR REDACTION BASED ON GROUP ASSOCIATION

BACKGROUND

In the context of viewing and capturing images/video, redaction can be carried out to obscure certain image details (for example, selected images or portions of video image frames in a video image stream). Also, it is more often than not the case that one or more objects are specifically targeted as part of the image/video portions that will ultimately be redacted. For example, security footage may include private information (such as, for example, license plates and faces) that need to be redacted to allow publishing or dissemination in a manner that would otherwise violate privacy or potential safety of individual(s). When video footage is used in a public manner, one has to consider whether there is some legal or other requirement to obscure people's faces, entire people, objects displaying disclosure-protected text, or other objects, in order to address privacy concerns.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method that includes analyzing, using at least one processor, first redacted data that is image or video data. The first redacted data including first redactions sized and shaped to conceal at least some features of at least first and second objects that: i) appear concurrently in at least one stored image corresponding to the first redacted data; or ii) appear concurrently during at least part of stored video corresponding to the first redacted data. The analyzing includes coming to a determination that, notwithstanding the at least some features are being concealed, a visible association between the first and second objects in combination with first size and shape definitions for the first redactions is such that an identity deducibility condition is either met or is not met. When the identity deducibility condition is not met, an indication is generated, using the at least one processor, that the first redacted data is sufficiently redacted for an intended purpose. When the identity deducibility condition is met, the first redacted data is converted into second redacted data using the at least one processor. The second redacted data includes second redactions having second size and shape definitions different than the first size and shape definitions. The second redactions, as compared to the first redactions, more sufficiently conceal identities of the first and second objects.

According to another example embodiment, there is provided a system that includes a storage device configured to store at least one of image data and video data. The system also includes at least one processor communicatively coupled to the storage device for data communications therewith. The at least one processor is configured to carry of a method that includes analyzing first redacted data corresponding to the image data or the video data. The first redacted data including first redactions sized and shaped to conceal at least some features of at least first and second objects that: i) appear concurrently in at least one stored image corresponding to the first redacted data; or ii) appear concurrently during at least part of stored video corresponding to the first redacted data. The analyzing includes coming to a determination that, notwithstanding the at least some features are being concealed, a visible association between the first and second objects in combination with first size and shape definitions for the first redactions is such that an identity deducibility condition is either met or is not met. When the identity deducibility condition is not met, an indication is generated that the first redacted data is sufficiently redacted for an intended purpose. When the identity deducibility condition is met, the first redacted data is converted into second redacted data using the at least one processor. The second redacted data includes second redactions having second size and shape definitions different than the first size and shape definitions. The second redactions, as compared to the first redactions, more sufficiently conceal identities of the first and second objects.

Each of the above-mentioned embodiments will be discussed in more detail below, starting with example system and device architectures of the system in which the embodiments may be practiced, followed by an illustration of processing blocks for achieving an improved technical method, system and computer program product for image and video redaction. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence.

Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include moving objects such as, for instance, people, animals and vehicles.

Further advantages and features consistent with this disclosure will be set forth in the following detailed description, with reference to the figures.

Figure 1:
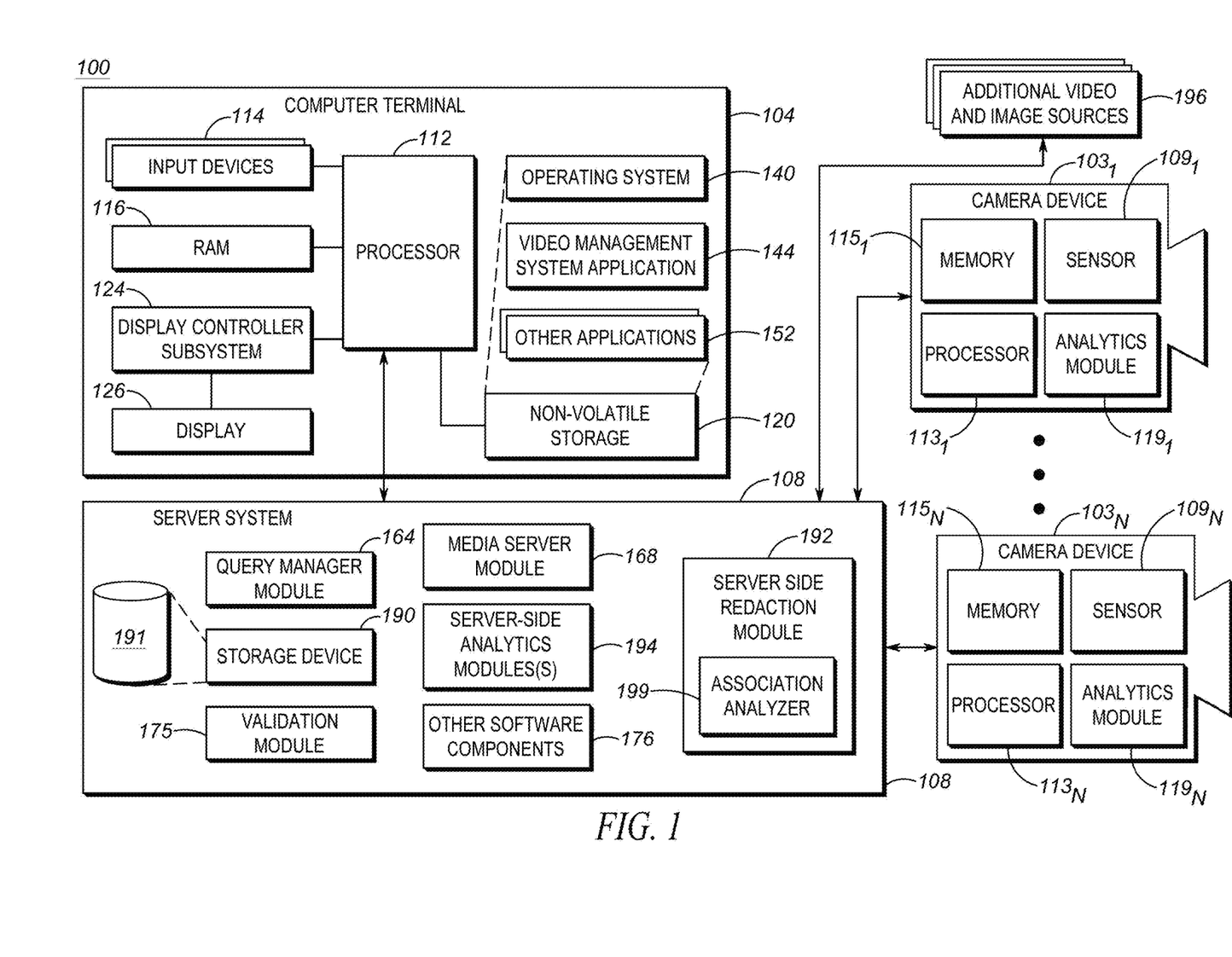
FIG. 1 is a block diagram of a video and image system in accordance with example embodiments.

Referring now to the drawings, and in particular FIG. 1 which is a block diagram of an example video and image system 100 within which methods in accordance with example embodiments can be carried out. Included within the illustrated video and image system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108. In some examples, part or all of the server system 108 is provided within the video and image system 100 by way of a cloud computing implementation.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the video and image system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, Video Management System (VMS) application 144, and other applications 152, or parts thereof, may be temporarily loaded into a volatile store such as the RAM 116. The processor 112, in addition to its operating system functions, can enable execution of the various software applications on the computer terminal 104.

Regarding the VMS application 144, this can be run on the computer terminal 104 and may include a search User Interface (UI) module for cooperation with a search session manager module in order to enable a computer terminal user to carry out actions related to providing input in relation to images, live video and video recordings (such as, for example, input to facilitate any one or more of annotating, redacting or selectively exporting video footage captured by one or more security cameras, providing responses to alerts in relation to unusual/suspicious activities, etcetera). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of various sorts of image/video-related data such as, for instance, actual video, actual images, metadata (including metadata related to disclosure-protected objects), etcetera. In this regard, the query manager module 164 is communicatively coupled to an at least one storage device 190 (described later herein in more detail).

Referring once again to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video and images taken by camera devices $103_1$-$103_N$ in the video and image system 100. In some examples, the media server module 168 may carry out other functions in relation to other forms of media communicated to the computer terminal 104 from the server system 108 (for example, facilitating the delivery of video clip alarms to the VMS application 144 to be viewed on the display 126 of the computer terminal 104). The server system 108 also includes server-side analytics module(s) 194 which can include, in some examples, any suitable one of known commercially available software that carry out computer vision related functions (complementary to any video analytics performed in the cameras) as understood by a person of skill in the art. The illustrated server system 108 also includes a validation module 175 employed to carry out validations when data-impacting modifications or changes are made within the server system 108, in order to minimize chances of any adverse unintended consequences in a manner that will be understood by those skilled in the art. The server system 108 also includes a server-side redaction module 192 (described later herein in more detail).

The server system 108 also includes a number of other software components 176. These other software components will vary depending on the requirements of the server system 108 within the overall system. As just one example, the other software components 176 might include special test and debugging software, or software to facilitate version updating of modules within the server system 108.

Regarding the at least one storage device 190, this comprises, for example, one or more databases 191 which may facilitate the organized storing of recorded video and images in accordance with example embodiments. The one or more databases may include at least one public safety database, but may also include other types databases like, for example, a database maintained by a security company. The one or more databases 191 may also contain metadata related to, for example, the stored video and images that will be subjected to redaction. The one or more databases 191 may also contain other types of metadata besides video/image metadata. Examples of metadata other than video metadata, that may be stored in the one or more databases 191, include audio metadata, GPS location metadata, etcetera.

The illustrated video and image system 100 includes a plurality of camera devices 103$_1$-103$_N$ (hereinafter interchangeably referred to as "cameras 103$_1$-103$_N$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the video and image system 100 includes any suitable number of cameras (i.e. N is any suitable integer greater than one).

The camera 103 includes an image sensor 109 for capturing a plurality of images. The camera 103 may be a digital video camera and the image sensor 109 may output captured light as digital data. For example, the image sensor 109 may be a CMOS, NMOS, or Charge-Couple Device (CCD). In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the video and image system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared and/or ultraviolet range. In other examples, the camera 103 may have similarities to a "multi-sensor" type of camera, such that the camera 103 includes pairs of two or more sensors that are operable to capture light in different and/or same frequency ranges.

The camera 103 may be a dedicated video camera. It will be understood that a dedicated video camera herein refers to a video camera whose principal features is to capture images or video. In some example embodiments, the dedicated video camera may perform functions associated with the captured images or video, such as but not limited to processing the image data produced by it or by another camera. For example, the dedicated video camera may be a fixed security camera, such as any one of a pan-tilt-zoom camera, dome camera, in-ceiling camera, box camera and bullet camera. The dedicated video camera may also be a mobile security camera such as, for example, a body-worn camera or an in-vehicle camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, physical access control device, video game console or controller.

The camera 103 includes one or more processors 113, one or more analytics modules 119, and one or more memory devices 115 coupled to the processors and one or more network interfaces. Regarding the analytics module 119, this generates metadata outputted to the server system 108. The metadata can include, for example, records which describe various detections of objects such as, for instance, pixel locations for a detected moving object in respect of a first record and a last record for the video camera within which the respective metadata is being generated. In some examples, the analytics may be all carried out external to the camera 103 (thus in such examples the camera would not include the optional analytics module 119).

Regarding the memory device 115 within the camera 103, this can include a local memory (such as, for example, a random access memory and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vision processing unit (operating optionally in combination with an artificial intelligence image signal processor), etcetera, and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store in memory (including store in volatile memory, non-volatile memory, dynamic memory, etc. or any combination thereof).

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN).

The one or more additional video and image sources 196 may be external or internal to the illustrated video and image system 100. The additional video and image sources 196 may include storage devices that store various types of additional video and data (including police record photos, witness-captured videos and images, etcetera, where any of these may be in combination or in alternative to any video and images stored in the storage device 190). In some examples, the additional video and image sources 196 may be in the cloud and/or located in third party systems, auxiliary systems, etc.

In some examples, the additional video and image sources 196 are coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the additional video and image sources 196 and the server system 108 can be any number of known arrangements, examples of which were previously herein detailed. In some examples, the additional video and image sources 196 may be coupled to the server system 108 in a more direct manner than as described above.

Figure 2:
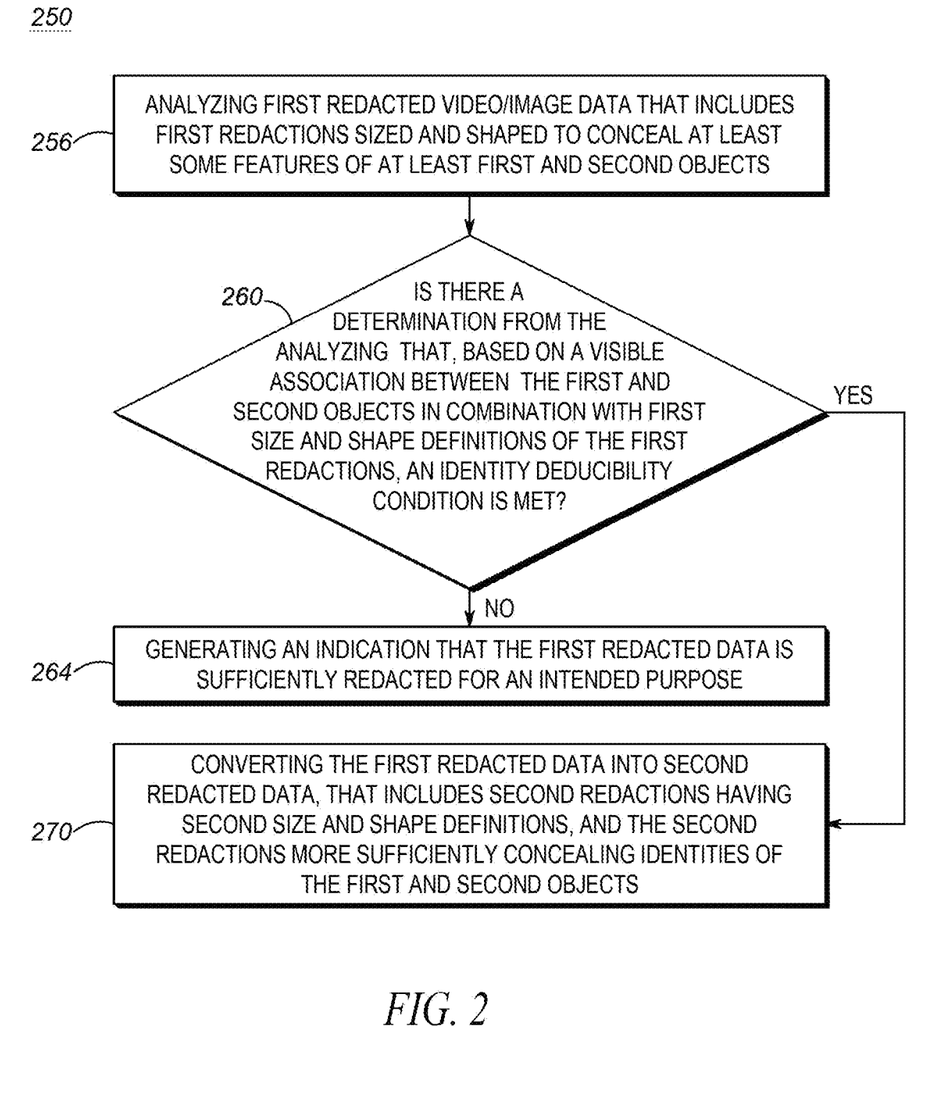
FIG. 2 is a flow chart illustrating a method in accordance with an example embodiment.
Figure 3:
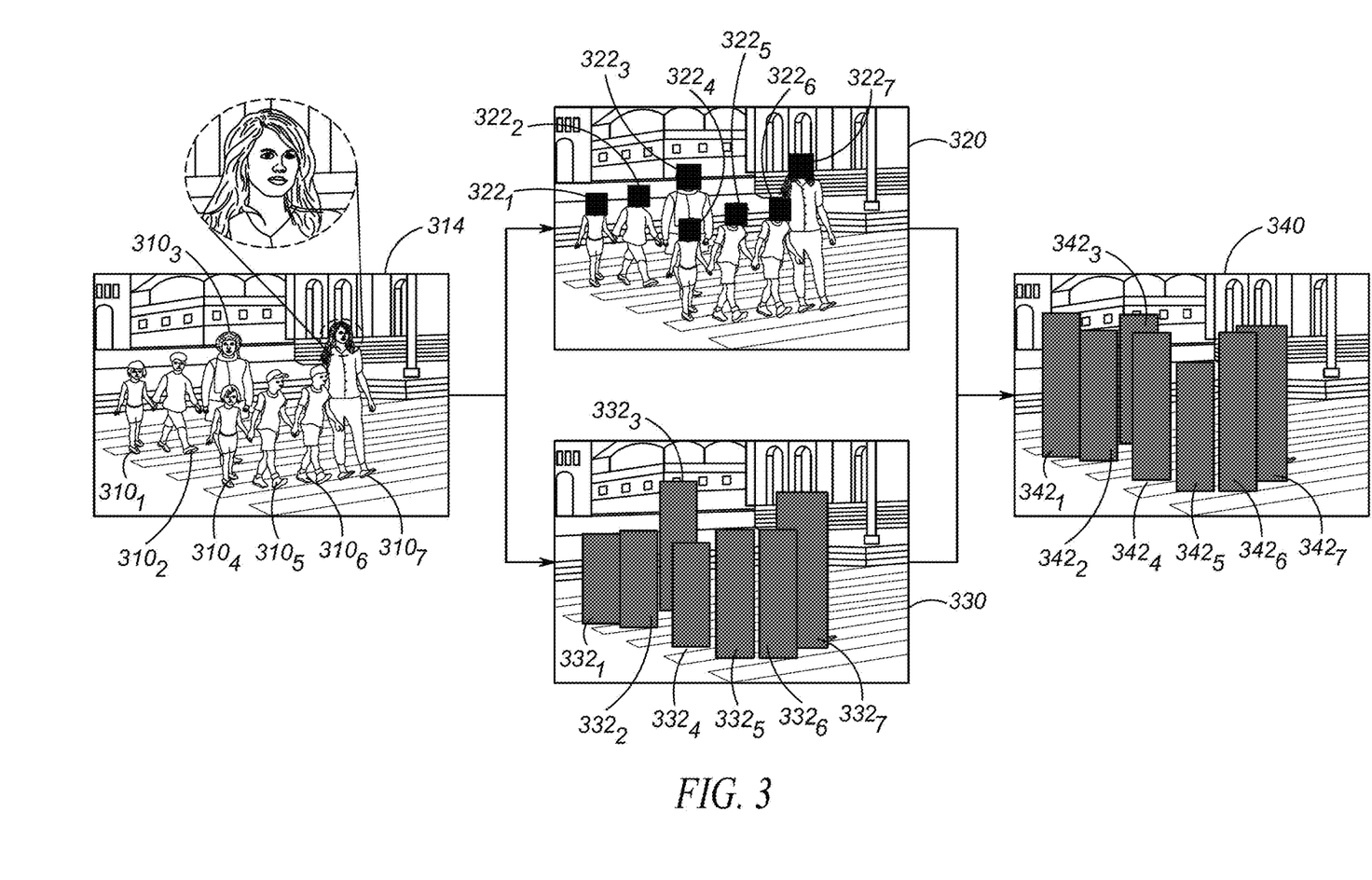
FIG. 3 is a diagram depicting stages of redaction of people in accordance with an example embodiment.

Reference is now made to FIGS. 2 and 3. Regarding FIG. 2, this is a flow chart illustrating a method 250 in accordance with an example embodiment. Regarding FIG. 3, this is a diagram depicting stages of redaction of people $310_1$-$310_7$ that appear concurrently in an image 314 (while the description that follows draws on the example of a stored image for convenience of explaining example embodiments, it will be understood that what is being described may similarly be carried out on stored video, where redaction is applied over a continuous duration from one defined starting point in time to a defined end point in time impacting a plurality of in-between video image frames).

With continuing reference to FIG. 2, the illustrated method 250, which in some examples is carried out within the video and image system 100, includes analyzing (256) first redacted data (i.e. redacted image or video data) that includes first redactions sized and shaped to conceal at least some features of at least first and second objects. For example, in FIG. 3 redacted image 320 includes a plurality of redactions $322_1$-$322_7$ that are sized and shaped to conceal the faces of the people $310_1$-$310_7$, and data associated with the redacted image 320 may be analyzed (for example, analyzed by an association analyzer 199 shown in FIG. 1) as explained in more detail below. As another example, alternative redacted image 330 includes a plurality of redactions $332_1$-$332_7$ that are sized and shaped to conceal the full bodies of the people $310_1$-$310_7$, and data associated with the redacted image 330 may be analyzed (for example, analyzed by the association analyzer 199) as explained in more detail below. (While the redactions shown in FIG. 3 are rectangular in shape, those skilled in the art will appreciate that other redaction shapes are possible).

Continuing on, the action 256 includes coming to a determination that, notwithstanding the at least some features are being concealed, a visible association between the first and second objects in combination with first size and shape definitions for the first redactions is such that an identity deducibility condition is either met or is not met. For example, a spectrum of deducibility may be considered where at one end of this spectrum the initial redacting is successful at making any guessing of identity effectively impossible and, by contrast, at the other end of the spectrum the initial redacting is clearly unsuccessful because notwithstanding the redacting it so happens that guessing of identity may be easy. Furthermore, it will be understood that there may be, for example, some point on this spectrum of deducibility (i.e. in-between the two aforementioned ends) where there is a threshold. Depending upon whether deducibility is above or below this threshold the identity deducibility condition is either met or is not met. In at least some examples, assessment of identity deducibility is carried out automatically via artificial intelligence (which may include employing, for example, at least one neural network or some other type of suitable learning machine) which takes as input any relevant data such as, for instance, data related to two-dimensional pixel width of one or more particular objects (which may be a time average in the video case), data related to two-dimensional pixel height of one or more particular objects (which again may be a time average in the video case), particular features of the object left at least partly unredacted (for example, hair color, tattoo, gait, item being carried/worn/connected), etcetera. In at least one example, the association analyzer 199 (FIG. 1) is responsible for the assessment of identity deducibility, and such identity deductibility assessment may be informed by data stored in the storage device 190 and/or data from the additional video and image sources 196.

Next the method 250 includes decision action (260) where based on the above-mentioned determination either an identity deducibility condition is met or is not met.

If the identity deducibility condition is not met, then an indication is generated (264) that the first redacted data is sufficiently redacted for an intended purpose. The indication may be generated within the server system 108 (FIG. 1) by a suitable server module such as, for example, the association analyzer 199. Alternatively, the indication may be generated in some other manner (for example, by an application running on processor 112).

If the identity deducibility condition is met, then the first redacted data is converted (270) into second redacted data. The second redacted data includes second redactions having second size and shape definitions that are different than the first size and shape definitions. Also, the second redactions, as compared to the first redactions, more sufficiently conceal identities of the first and second objects. Redacted images 320 and 330 shown in FIG. 3 correspond to examples where the identity deducibility condition is met. Explanation of the reason will follow, but clearly as to the redacted image 320, it is converted into redacted image 340 which includes a plurality of redactions $342_1$-$342_7$ that are sized and shaped to conceal the full bodies of the people $310_1$-$310_7$, and a similar conversion is carried out in respect of the other example (i.e. the redacted image 330).

In terms of why the identity deducibility condition is met in the case of either the redacted image 320 or the redacted image 330, it is because there is one school teacher (the person $310_7$) who is walking beside a plurality of students, so even with redacting out the faces in the redacted image 320, it is still possible to guess that the person $310_7$ is a teacher because the facial redactions are not sized to be capable of concealing that there are five small people in the redacted image 320 who are likely children and that there are two adult-sized people in the redacted image 320 who may be teachers. (A similar analysis logic as applies to the redactions $322_1$-$322_7$ also applies to the redactions $332_1$-$332_7$, which while being larger size redactions than the face redactions still are not sufficiently concealing that the person $310_7$ may be a teacher.) As a further note, there may be other factors related to the unredacted part of the redacted image contributing to identity deducibility such as, for example, the cross walk visible in the background, some object being carried by one or more of the adults (like a backpack, which also incidentally would not for a part of facial redacting), etcetera.

As contrasted to the redactions $322_1$-$322_7$ and the redaction $332_1$-$332_7$, the plurality of redactions $342_1$-$342_7$ are better concealing the identity of the person $310_7$ because the redaction rectangles for the children have been made closer in size to the redaction rectangles for the adults. In some examples, there may be relative size comparisons of the individual redactions against each other to confirm identity non-deducibility is sufficient (for instance, no one redaction may have a height and/or width 30% less (or some other defined fraction) than the height and/or width of another redaction amongst a group of objects that are visibly associated together in the image or video being redacted).

Of course the above described defined fraction redaction rule is just one possible example, and those skilled in the art will appreciate that other possible prohibited redaction pattern rules are contemplated as suitable for at least some example embodiments. Also, it will be understood that even in the further redacted image 340 not all unredacted image pixels are non-impacting (for example, the crosswalk can still be seen), but nonetheless the changes have indeed made identity deducibility more unlikely.

Of course example embodiments are not limited to modifying redactions where one large object is visibly associated together with a plurality of much smaller objects. The method 250 illustrated in FIG. 2 may even apply when there is only a pair of objects visibly associated together. As an example in this regard, take the case of two child classmates that are known to hang out together where one is tall and slender, and the other is shorter and heavyset. In such a case, again initial redactions may not be sufficient to conceal identities of the two classmates (especially when combined with other factors impacting assessment by the association analyzer 199).

The audience receiving the redacted video or image(s) may also impact raising or lowering the threshold as to whether the identity deducibility condition will be met or not met. For example, it may be clear that people receiving redacted video or image data may have never met or heard of any of the people in the redacted image or video. Changing the redactions to stronger conceal identity may not be as necessary in such circumstances as in a scenario where it is clear that people receiving the redacted video or image data will know various specific personal and/or social details about the people in the redacted image or video. Information about the receiving audience may, in some examples, be retrievable from the additional video and images sources and/or stored in the storage device 190.

Those skilled in the art will understand that the method 250 of FIG. 2 may be repeated any suitable number of times as part of an overall larger redaction process. Taking the FIG. 3 example, after the actions of the method 250 are carried out in relation to the redacted image 320 or the redacted image 330, the actions of the method 250 may be carried out again in relation to the redacted image 340.

While much of the above discussion was made in reference to people as examples of redactable objects to which example embodiments are applicable, other examples of disclosure-protected objects are contemplated as well. For instance, vehicles (cars, trucks, motorcycles, etcetera) may travel together as groups and have identities that might be capable of being guessed even after initial redactions are applied to parts or entireties of those vehicles.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot act on images or video to redact disclosure-protected objects, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate element or device via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
   analyzing, using at least one processor, first redacted data that is image or video data, and the first redacted data including first redactions sized and shaped to conceal at least some features of at least first and second objects that:
   appear concurrently in at least one stored image corresponding to the first redacted data, or
   appear concurrently during at least part of stored video corresponding to the first redacted data, and
   wherein:
   the analyzing includes coming to a determination that, notwithstanding the at least some features are being concealed, a visible association between the first and second objects in combination with first size and shape definitions for the first redactions is such that an identity deducibility condition is either met or is not met, and the identity deducibility condition being met or not met following from carrying out of an automatic assessment in which at least one learning machine is employed, and an outcome of the automatic assessment being impacted at least in part by at least one of a relative height percentage difference and a relative width percentage difference between at least two of the first redactions;

when, following the automatic assessment, the identity deducibility condition is not met, generating an indication, using the at least one processor, that the first redacted data is sufficiently redacted for an intended purpose; and when, following the automatic assessment, the identity deducibility condition is met, converting the first redacted data into second redacted data using the at least one processor, and wherein:

the second redacted data includes second redactions having second size and shape definitions different than the first size and shape definitions, and the second redactions, as compared to the first redactions, more sufficiently conceal identities of the first and second objects.

2. The computer-implemented method of claim 1 wherein the first and second redactions are rectangular shaped.

3. The computer-implemented method of claim 2 wherein the at least first and second objects are at least first, second and third objects, and relative sizes of the first, second and third objects result in the first size and shape definitions being such that they cause the identity deducibility condition to be not met.

4. The computer-implemented method of claim 3 wherein the identity deducibility condition is not met because an average height of redactions corresponding to each of the second and third objects is at least substantially below a defined fraction of an average height of a redaction corresponding to the first object.

5. The computer-implemented method of claim 1 wherein the first and second objects are people who have known association in a public safety database.

6. The computer-implemented method of claim 1 wherein the first and second objects are objects which have known association in a public safety database.

7. The computer-implemented method of claim 1 further comprising capturing the image or video data via a camera, and wherein the at least one processor is communicatively coupled to the camera via at least one network.

8. The computer-implemented method of claim 1 further comprising capturing the image or video data via a camera, and wherein the at least one processor is contained in a same housing as the camera.

9. The computer-implemented method of claim 1 further comprising employing the at least one processor to make an additional determination that identity deducibility condition is not met in respect of the second size and shape definitions for the second redactions.

10. The computer-implemented method of claim 1 wherein the converting the first redacted data into the second redacted data includes applying at least one prohibited redaction pattern rule.

11. The computer-implemented method of claim 1 further comprising retrieving, using the at least one processor, information about identity knowledge possessed by a respective receiving audience in relation to the at least first and second objects, wherein the receiving audience is receiving the first or second redacted data, and the outcome of the automatic assessment is further impacted by the information about the identity knowledge.

12. A system comprising:

a storage device configured to store at least one of image data and video data; and at least one processor communicatively coupled to the storage device for data communications therewith, and the at least one processor being configured to carry of a method that includes:

analyzing first redacted data corresponding to the image data or the video data, and the first redacted data including first redactions sized and shaped to conceal at least some features of at least first and second objects that:

appear concurrently in at least one stored image corresponding to the first redacted data, or appear concurrently during at least part of stored video corresponding to the first redacted data, and wherein:

the analyzing includes coming to a determination that, notwithstanding the at least some features are being concealed, a visible association between the first and second objects in combination with first size and shape definitions for the first redactions is such that an identity deducibility condition is either met or is not met, and the identity deducibility condition being met or not met following from carrying out of an automatic assessment in which at least one learning machine is employed, and an outcome of the automatic assessment being impacted at least in part by at least one of a relative height percentage difference and a relative width percentage difference between at least two of the first redactions;

when, following the automatic assessment, the identity deducibility condition is not met, generating an indication that the first redacted data is sufficiently redacted for an intended purpose; and when, following the automatic assessment, the identity deducibility condition is met, converting the first redacted data into second redacted data using the at least one processor, and wherein:

the second redacted data includes second redactions having second size and shape definitions different than the first size and shape definitions, and the second redactions, as compared to the first redactions, more sufficiently conceal identities of the first and second objects.

13. The system of claim 12 further comprising at least one camera, communicatively coupled to the storage device, configured to:

capture the image or video data, and transmit the image or video data to the storage device for storage therein.

14. The system of claim 12 wherein the storage device is further configured to store the second redacted data.

15. The system of claim 12 wherein the first and second objects are people who have known association in a public safety database.

16. The system of claim 12 wherein the first and second objects are objects which have known association in a public safety database.

17. The system of claim 12 wherein the at least one processor is further configured to make an additional determination that identity deducibility condition is not met in respect of the second size and shape definitions for the second redactions.

18. The system of claim 12 wherein the converting the first redacted data into the second redacted data includes applying at least one prohibited redaction pattern rule.

19. The system of claim 12 wherein:
- the method further includes retrieving information about identity knowledge possessed by a respective receiving audience in relation to the at least first and second objects, and
- the receiving audience is receiving the first or second redacted data, and the outcome of the automatic assessment is further impacted by the information about the identity knowledge.

* * * * *